3,763,074
EMULSION FOR RUBBERIZING ASPHALT
Fritz S. Rostler, 1182 Miller Ave.,
Berkeley, Calif. 94708
No Drawing. Original application Mar. 20, 1968, Ser. No. 714,424, now Patent No. 3,577,250. Divided and this application Jan. 21, 1971, Ser. No. 108,596
Int. Cl. C08c *11/68;* C08h *13/06;* C08j *1/46*
U.S. Cl. 260—29.7 GP 14 Claims

ABSTRACT OF THE DISCLOSURE

Method of incorporating an elastomer into asphalt by treating the asphalt pavement with an emulsion having an external water phase and an oil phase containing a dissolved elastomer, the oil preferably having an initial boiling point of not substantially less than 300° C. at 760 mm. Hg and a viscosity of above about 50 SUS at 210° F., the oil being mutually compatible with the asphalt and the elastomer.

BACKGOUND OF THE INVENTION

This application is a division of application Ser. No. 714,424, filed Mar. 20, 1968, now Pat. No. 3,577,250.

The literature on adding rubber to asphalt for the purpose of producing an improved binder for use in highway construction is very voluminous. Highway engineers, polymer chemists, asphalt technologists, roadbuilders, and economists have presented a wealth of information to bring to the attention of the general public the potentially great economic impact of the use of rubber in asphalt.

Recommendations to use rubber for improvement of highway asphalts date back for more than a century. A historic review of the work performed covering the field from the earliest development to known current projects, which also contains some predictions for the future of this technological field, has been recently presented by Kenneth Allison in the trade journal Rubber World (New York, March and April 1967) under the title "Those Amazing Rubber Roads." Another interesting discussion of the technical aspects of this field, particularly with reference to the work carried out in Russia has been presented by K. Shaw in the October 1967, issue of Rubber Journal (Croydon, England) under the title "Rubber for Road-Making and Building Materials." The chapter "Rubber Modifiers" by D. C. Thompson in A. J. Hoiberg, Bituminous Materials, vol. I, pp. 375–414, Interscience Publishers (New York, 1964), in another technical review of the status of the art. A very extensive study exploring the effects of rubber added to asphalt has been published by Lewis and Welborn, Public Roads, 28, pp. 64–89 (October 1954). In general, all of the prior art pertaining to the incorporation of rubber into asphalt requires adding the rubber to hot asphalt prior to its use in road construction. The addition of the rubber to the asphalt takes place either at the refinery or at the hot plant where heat-liquefied asphalt is mixed with aggregate. Neither procedure is satisfactory. When rubber is added at the refinery, both the added rubber and the asphalt are degraded by prolonged heating and excessive temperatures as required to maintain the asphalt for an extended period of time in a liquid state prior to its use. When the rubber is added at the hot plant, it is not fully dissolved in the asphalt, and the added rubber is not only ineffectively utilized in the asphalt, but the undissolved rubber is actually harmful.

The degradation of the rubber dispersed in asphalt by heat is a time-temperature phenomenon. Degradation of the rubber increases with time that the rubber and the asphalt are maintained at an elevated temperature sufficient to liquefy the asphalt. Degradation of the rubber is also greater as the temperature of the asphalt and rubber mixture becomes more elevated.

Further, the addition of rubber to the asphalt before construction of the pavement completely changes the characteristics of the asphalt and brings the asphalt outside the specifications which is highly objectionable from the standpoint of highway engineers who are faced with the problem of building highways using existing specifications and construction practices. Such specifications and construction practices are the result of a systematic evolution based on meticulous observations of the correlation of road performance with specifications. To employ a modified asphalt which does not fit existing specifications would require discarding the existing knowledge in the field in an attempt to derive new specifications and construction procedures to suit the new material.

In solving the above problems, it is an object of my invention to provide a method for rubberizing asphalt used in asphalt pavements which does not require the addition of a rubber to heat liquefied asphalt nor hot storage of the rubberized asphalt for a prolonged period of time prior to its combination with the aggregate used in forming the pavement.

A further object of my invention is to provide a method for rubberizing asphalt which does not require a change in present road specifications and construction practices since the asphalt is rubberized after the asphalt concrete has been laid down to form the road.

As briefly described, my method consists of incorporating rubber into an asphalt structure as a finishing operation after substantially all of the basic steps of construction have been completed. My process does not require the addition of rubber at the refinery or in the hot plant and does not require any change in existing asphalt specifications. Moreover, my new method of application assures that the total quantity of rubber employed is an "effective" rubber in forming a bond between the aggregate particles by means of the rubberized asphalt containing a small amount of rubber, thus reducing the cost of the rubber additive.

My method comprises making a solution of an elastomer in a suitable oil, emulsifying this solution in water, and applying the emulsion in proper dilution at a desirable rate to the asphalt pavement. The preferred emulsification system is one resulting in a cationic emulsion. The oil in my preferred embodiment should have an initial boiling point not much below 300° C. at atmospheric pressure, as determined by ASTM test method D86. The oil used in my preferred embodiment is one which is substantially free of asphaltenes, i.e., having a maximum content of asphaltenes not more than about one percent, and having a viscosity of at least 50 SUS at 210° F. Oils in the range of 50 to about 200 SUS at 210° F. are generally satisfactory. Preferably, the oil should be soluble in n-pentane, according to the method described in ASTM designation D2006–65T. This method has been further described in "Composition and Changes in Composition of Highway Asphalts, 85–100 Penetration Grade," published in Proceedings of Association of Asphalt Paving Technologists, vol. 31, January 1962, at pp. 72–79. The elastomer should be soluble in the oil and the oil should be compatible with the asphalt and elastomer.

The quantity of elastomer present in the oil may be varied depending upon the amount of elastomer to be combined with the asphalt within the treated asphalt pavement. In general, elastomer concentrations of about 2 to about 15 percent by weight of the oil, and preferably about 7.5 percent by weight of the oil have been found satisfactory. However, if desired, higher concentrations may be employed.

The solution of elastomer in oil, as described, is then emulsified in water. Typical of emulsification equipment which may be used in forming the emulsion are colloid mills, high speed emulsifiers, ultrasonic emulsifiers, homogenizers, pipeline mixers, etc. Any emulsification equipment can be used which produces a fine particle size emulsion of high stability, i.e., an emulsion which will not break on contact with the road surface and which will penetrate into the pavement to the depth desired.

The quantity of water employed in the emulsion can be varied within the scope of my invention, depending upon the treatment to be given a particular asphalt pavement. Thus, for example, an emulsion containing 20–50% by weight of water and 80–50% by weight of the oil phase, including the elastomer dissolved therein may be employed. It, itself, can be applied to asphalt pavement or it can be further diluted with water, e.g., from 0.5 to 4 parts of water per part of emulsion concentrate, prior to its application to the pavement.

As stated previously, in the practice of my method, the emulsion is applied to asphalt-aggregate mixture after it has been laid down to form a surface. The emulsion may be applied by spraying the road using conventional truck sprayers, immediately after the pavement has been laid down while it is still at elevated temperature somewhat above its softening point and while it is cooling. Also, for example, the emulsion may be applied to asphalt pavement after it has been compacted by steel rollers or even later in the road building procedure after the pavement has been compacted by pneumatic rollers. The permeability of the asphalt pavement will, of course, vary depending upon the type and grading of the aggregate and the degree of compaction. The porosity and void content of the asphalt pavement are variables which affect the rate at which the emulsion will penetrate the asphalt pavement and the amount of emulsion accepted by the pavement.

Similarly, the degree of dilution of the emulsion is a variable which will affect the rate of penetration of the emulsion into the asphalt. Thus, for example, if the asphalt pavement is relatively dense and has received a high degree of compaction, it may be desirable to use a more dilute emulsion, that is, one having a higher content of water. The increased water content of the emulsion will assist its penetration into the highly compacted asphalt-aggregate mix to give a uniform distribution of the elastomer throughout. Conversely, in treating an asphalt having a relatively low degree of compaction, it may be desirable to use a more concentrated emulsion to insure that the emulsion will not penetrate too rapidly into the asphalt and not run through it without depositing the elastomer.

As described, it is generally preferable in the performance of my process that the emulsion be applied to the asphalt during the road building operation. In some instances, however, it may be desirable to treat a pavement after construction has been completed or after it has been in use for some time to improve its properties, e.g., reduce its void content.

A further variable in my process is the rate at which the elastomer contained in the emulsion plates out on the asphalt and aggregate in the road structure. In general, it is desirable that the emulsion be a stable emulsion, i.e., does not break until the emulsion has penetrated the asphalt concrete to the depth desired. The time required for penetration will, of course, depend on the grading of the aggregate, degree of compaction of the asphalt pavement and also on the degree of dilution of the emulsion. Concerning the depth of penetration desired, a relatively concentrated emulsion will deposit the elastomer solution in the upper surface of the asphalt pavement. Using a more dilute emulsion, the elastomer will be distributed more uniformly through the pavement or may be concentrated in the lower portion of the pavement. To accomplish the latter result, a fairly dilute emulsion will penetrate more easily into the pavement and will not plate out the elastomer solution therein until after it has penetrated to a considerable depth into the asphalt. The rate of plating out will also depend on the emulsification system in that a cationic emulsion will plate out more readily than an anionic emulsion.

All of the above variables—degree of compaction of the asphalt, degree of dilution of the emulsion, nature of the emulsion, and desired elastomer concentration within the asphalt, are interrelated in the performance of my process. Thus, even though a stable cationic emulsion is preferred in the performance of my process, a relatively fast breaking emulsion or anionic emulsion could be employed, under conditions where the emulsion penetrates relatively rapidly and does not break at the surface.

The concentration of the emulsion should be such that the emulsion penetrates into the pavement before the water evaporates to leave an oil film in the road surface. Further, the emulsion should not be so dilute that it runs through the pavement to the base course.

One objective is to use the emulsion at a concentration of the oil in the water so that the oil and the rubber content plates out on the asphalt uniformly throughout the depth of the asphalt-aggregate phase. A trial on a section of the pavement treated by spraying the oil on to the surface of the pavement to cover the section, will show whether the emulsion is too concentrated such as to produce an oil film on the pavement surface. Further, a sample core of the asphalt pavement and a suitable extraction of the asphalt will show the distribution of the rubber component in the asphalt. Such techniques are common in the art of road building and will be well understood by those skilled in the art.

The amount of rubber which is added to the asphalt in the practice of my invention may be varied depending upon the properties desired in the finished pavement.

The oil emulsion is spread in gallons per square yard of the pavement to provide an amount of elastomer relative to the asphalt which is contained in the pavement so as to result in a concentration of an elastomer in an amount between about 0.1 to about 2.5 percent by weight of the asphalt. This ratio is presently contemplated to constitute the best mode of carrying out my invention. If desired, however, higher amounts of elastomer can be added such as 5 or even 10 percent by weight of the asphalt depending upon the properties desired in the asphalt pavement and the solubility characteristics of the particular polymer in the particular oil.

The concentration of the elastomer in the oil, will depend on the amount of polymer to be added to the asphalt and on the concentration of the oil phase in the emulsion applied to the road. A concentration in the range of from about 2% to about 15% of elastomer based on the oil is most satisfactory with the amount of oil which is added to the asphalt being maintained at a level below that at which it will dissolve or strip the asphalt from the aggregate and redeposit the asphalt from one place in the pavement to another. As presently contemplated in the best mode for carrying out my invention, the oil added to the pavement in the emulsion should not exceed about one-third of the weight of the asphalt in the pavement. The oil content may be considerably less than this concentration, for example, about 5–15 percent by weight of the asphalt in the pavement.

The asphalt content of a particular pavement is set forth in the specifications for the pavement which are maintained by the agency, such as State Highway Departments, or other public bodies, responsible for its construction. In general, the asphalt content of a pavement may range between about 4½ to 7 percent of the total weight of the pavement. The ratio of the rubber to the asphalt in the pavement in the best mode now contemplated by me, is given by the above description of the composition of the asphalt pavement and the elastomer content of the asphalt in the pavement.

The following examples illustrate the effect of treating an asphalt-aggregate combination with an emulsion ac- per square yard per inch of depth of the pavement will thus depend on the weight of pavement per inch of depth and the asphalt content of the pavement. This data is available from the specifications issued for the construction of the road. The concentration of the rubber in the oil and the concentration of the oil in the emulsion will give the additional information from which the application rate in gallons per square yard per inch of pavement desired to be penetrated by the emulsion may be derived.

The rate of application and thus the degree of rubberizing can be varied to accommodate any construction specification. To facilitate calculations, pavement density can in many cases be assumed to be 144 lbs. per cubic ft. and the asphalt content to be 6% by weight of the pavement. If then, for instance, elastomer is to be incorporated into the asphalt contained in the pavement in the amount of 1% by weight of the asphalt and the emulsion delivered to the job site contains 60% by weight of oil phase which is a 10% elastomer solution in the oil, the emulsion should be further diluted at a ratio of 2 parts of emulsion to 1 part of water and the diluted emulsion applied at the rate of 0.20 gallons per square yard per 1 inch depth of the compacted pavement. If other emulsions than the above, e.g., one containing more or less elastomer is to be used, the rate of application may be adjusted accordingly.

The treatment of an asphalt pavement with the emulsion of my invention not only results in improved rubbery properties of the pavement, but also reduces the air voids of the asphalt concrete and adds to its durability. In this respect, my method achieves a result which differs greatly from that obtained by previously suggested methods of incorporating rubber into asphalt. In previous methods, most of the rubber was not completely intermixed with the asphalt but rather was distributed in the form of discrete individual rubber particles throughout the mix in which most of the added rubber was present in the form of discrete small elastic aggregates and not as modifier of the asphaltic binder.

In my invention, the oil-rubber solution is applied to the pavement in the form of an emulsion in which the water is the outer phase and the rubber solution is the inner phase. This constitutes a preparation containing two media for depositing the rubber in the asphalt binder. The oil used for dissolving the rubber serves as a carrier for the rubber to be combined with the asphalt in the pavement and as a mutual solvent for both the asphalt and the rubber; the water in the emulsion serves as a carrier for the solution to be deposited on the asphalt in the pavement.

The rate of application of the oil emulsion in gallons according to my invention.

The asphalts treated were of different origin as representative of asphalts widely used in highway construction. These two asphalts are defined in Table I. I have shown in previous work that all asphalts can be ranked in quality in five durability groups. The result of this previous work have been reported in the literature (Rostler, Fritz S., "Prediction of Performance Based on Asphalt Composition Using Precipitation Methods," Proc. Highway Conference on Research and Development of Quality Control and Acceptance Specifications Using Advanced Technology, vol. 2, Asphalt Technology, Bureau of Public Roads, Washington, D.C., April 1965, pp. 93–158, and Rostler, F. S., "Fractional Composition, Analytical and Functional Significance," in Bituminous Materials, vol. II, part 1, p. 207, edited by A. J. Hoiberg, New York, Interscience Publishers, 1965). The two asphalts used in the following tests were of relatively low durability.

TABLE I.—IDENTIFICATION OF ASPHALTS USED

| Origin | Boscan (B) (Venezuela) | San Joaquim Valley (V) (California) |
|---|---|---|
| Penetration | 52 | 56 |
| Viscosity at 77° F. (megapoises): | | |
| At 0.05/sec | 3.1 | 2.60 |
| At 0.001/sec | 4.8 | 2.65 |
| Shear susceptibility | 0.11 | 0.00 |
| Microductility at 77° F. (mm.) | 54 | 63 |
| Chemical composition: | | |
| A (percent) | 30.1 | 11.1 |
| N (percent) | 20.3 | 39.9 |
| $A_1$ (percent) | 24.2 | 16.6 |
| $A_2$ (percent) | 18.7 | 19.6 |
| P (percent) | 6.7 | 12.8 |
| Molecular weight of A | 3,630 | 2,715 |
| $(N+A_1)/(P+A_2)$ | 1.75 | 1.75 |

As can be seen from the data in Table I, the two asphalts used are of the same penetration grade, but differ considerably in composition and rheological properties, e.g., shear susceptibility, as indicated by viscosity data. The data in Table II show that the rubber preparations used differ substantially in polymer type and concentration and also in type of oil.

A number of solutions and emulsions containing various elastomers in oil are set forth in Table II. The oils have compositions and properties which are similar to the pentane soluble fractions of asphalts. Such fractions are sometimes referred to in asphalt literature as maltenes. I also used other oils differing in composition from maltenes usually found in asphalts. These are defined in Table II.

TABLE II.—RUBBER PREPARATIONS

| Identification | | Polymer type | Percent polymer content of oil phase | Oil |
|---|---|---|---|---|
| Solution | Emulsion | | | |
| | 4 | None | None | 50% SAE-50 medium lube distillate; 50% extract from medium lube distillate. |
| | 41(23) | Natural rubber, #1 RSS | 5 | Do. |
| | 42 | do | 7.5 | Do. |
| | 36 | SBR-1500 | 5 | Do. |
| 35 | 37 | do | 7.5 | Do. |
| | 38 | do | 10 | Do. |
| | 18 | Synthetic cis-poly(isoprene) | 5 | Do. |
| 7 | 24 | Synthetic trans-poly(isoprene) | 10 | Do. |
| | 20 | SBR block copolymer (35/65 S/B ratio) | 10 | Do. |
| 10 | 26 | SBR bolck copolymer (40/60 S/B ratio) | 10 | Do. |
| | 22 | SBR block copolymer (50/50 S/B ratio) | 10 | Do. |
| | 46 | SBR block copolymer (25/75 S/B ratio) | 5 | Do. |
| 45 | 47 | do | 7.5 | Do. |
| | 48(25) | do | 10 | Do. |
| | 67 | do | 7.5 | 89% heavy cylinder stock; 11% nitrogen bases* from gilsonite. |
| | 3599 | do | 7.5 | 75% heavy lube distillate; 25% extract from medium lube distillate. |

*Nitrogen bases from gilsonite having the following typical properties:
Initial boiling point at 760 mm Hg, ° F _____ 226
Chemical composition (ASTM method D2006):
A, percent _____ 2.3
N, percent _____ 91.1
$A_1$, percent _____ 4.2
$A_2+P$, percent _____ 2.4

Turning to the oils which I employed, the medium lube distillate had a viscosity of 80 Saybolt Universal seconds (SUS) at 210° F.

The extract from medium lube distillate had a viscosity of 90 SUS at 210° F. and the heavy cylinder stock had a viscosity of 150 SUS at 210° F. The product nitrogen bases derived from gilsonite was supplied under the designation GN-104 by the American Gilsonite Company. The heavy lube distillate had a viscosity of 150 SUS at 210° F.

The various emulsions described in Table II, each contain 60 percent by weight of the oil phase. The elastomer content in weight percent based on the weight of oil is set forth in col. 6. Each of the emulsions, with the exception of Emulsion 67, contain 0.9 percent by weight of a nonionic emulsifier (Oronite Dispersant NI-W), 0.6 percent by weight of a fatty amine, Redicote E-1 (Armour Industrial Chemical Company), believed to be tallow diamine, 0.3 percent by weight of glacial acetic acid, and 38.2 percent by weight of water. In lieu of the fatty amine denoted as Redicote E-1, the fatty amine sold as Formonyte 802 (Foremost Chemical Products Company) may be employed.

The emulsion denoted #67 is the same as the other emulsions except that it does not contain a nonionic emulsifying agent but contains 1.2 percent by weight of the fatty amine (Redicote E-1), and 0.6 percent by weight of glacial acetic acid. In addition to the preparations shown in Table II, several others were prepared which contained 15%, 20% and 25% of polymer dissolved in the oil. Preliminary orientation tests carried out with these preparations reveal that the higher concentrations of polymer in the asphalt do not offer any particular advantage and that the range of 0.1 to 2.5 percent rubber in the asphalt is the most desirable, both economically and as far as the relative effectiveness of the rubber is concerned. The natural rubber No. 1 RSS is a high-grade, unvulcanized natural rubber commercially available from any dealer of natural rubber under the standard designation of No. 1 ribbed smoked sheets.

The synthetic rubber SBR-1500 is described in ASTM designation D-1419-62T. The particular sample used was Ameripol 1500 from Goodrich Gulf Chemicals, Inc., the synthetic cis-poly(isoprene) used was Natsyn 200 from Goodyear Chemical Division and the synthetic trans--poly(isoprene) was Trans-Pip from Polymer Corporation Limited. The SBR block copolymer having the 35/65 styrene to butadiene ratio was polymer 821-CD, obtained from Phillips Petroleum Company; the SBR block copolymer having the 40/60 styrene to butadiene ratio was Phillips Polymer 824-CD and the SBR block copolymer having the 50/50 styrene to butadiene ratio was Phillips Polymer 825-CD. The SBR block copolymer having the 25/75 styrene butadiene ratio was Kraton 101 supplied by Shell Chemical Company.

The particular samples of block copolymers used are further characterized by having the following typical properties in the unvulcanized stage:

| Polymer designation | Mooney viscosity MS-4 [1] | Brookfield viscosity of 15% solution in trichlor-ethylene, cp. at 77° F. | Tensile strength (p.s.i.) [2] | Elongation at break [2] (percent) |
| --- | --- | --- | --- | --- |
| 821-CD | 104 at 240° F | 3,600 | 4,000 | 810 |
| 824-CD | 94 at 212° F | 12,000 | 2,750 | 975 |
| 825-CD | 46 at 275° F | 850 | 3,400 | 800 |
| Kraton 101 | | 2,450 | 5,100 | 875 |

[1] ASTM designation D 1646.
[2] ASTM designation D 412.

The emulsions were employed in treating asphalt in the manner described in the following examples in which all parts and percentages are by weight unless otherwise indicated.

A well established method of testing the changes occurring in an asphalt during hot mixing with aggregate and on aging of asphalt in asphalt-aggregate pavements consists in mixing two parts of asphalt with 100 parts of Ottawa sand of specified properties under controlled conditions, dividing this mix into several portions, artificially aging the mixes under specified conditions for specified lengths of time, and then measuring the abrasion resistance of specimens prepared from them by measuring the weight loss of the specimen. Specifications for those tests have been designated and description of the tests have been published by the California State Division of Highways (Skog, J. B., "The Operation, Control and Application of the Infra-red Weathering Machine—California Design," ASTM Special Technical Publication No. 212, pp. 1-12 (1957)). Methods of mixing, aging, and testing using smaller specimens and giving information which is easily converted to the same numerical values as obtained in the State of California method have also been developed and published in detail (Rostler, F. S. and R. M. White, "Influence of Chemical Composition of Asphalts on Performance, Particularly Durability," Symposium on Road and Paving Materials—1959, American Society for Testing and Materials Special Technical Publication 277, pp. 64-88 (1960)); Rostler, F. S., and R. M. White, "Composition and Changes in Composition of Highway Asphalts, 85-100 Penetration Grade," Proc. Association of Asphalt Paving Technologists, 31, pp. 35-89 (1962); and Halstead, W. J., F. S. Rostler and R. M. White, Properties of Highway Asphalts—Part III, Influence of Chemical Composition, Proc. Association of Asphalt Paving Technologists, 35, pp. 91-138 (1966). The above-mentioned tests developed by the California State Highway Department (see Skog, supra), have been correlated with field performance and are accepted as reliable by highway engineers and asphalt technologists as indicating the durability of asphalt pavements.

The less the weight loss of the specimen from abrasion under the conditions of the test, the greater is the durability of the asphalt and the expected life of the pavement incorporating the asphalt. (See also, Skog, "The Operation Control and Application of the California Design Infra-red Weathering Machine," ASTM Special Technical Publication No. 212, pp. 1-11.)

The pellet abrasion test described in the above Rostler et al., articles have been correlated with the California Abrasion Test (see the Skog articles, above), and Rostler et al., Proceedings of Asphalt Paving Technologists, vol. 31 at p. 39.

In order to evaluate my method of treatment, which is to add the rubber to the asphalt-aggregate mix existing in the pavement rather than to the asphalt to be mixed with the aggregate in the hot plant or the refinery, I used the above-described laboratory procedures in very extensive tests.

These tests show beneficial results of the effectiveness of my method of treatment of pavements. These tests show that the addition of the elastomer dissolved in oil to asphalt, where the exposure to high temperature is limited, results in a substantial increase in the durability of the asphalt. The addition of the elastomer to the asphalt in the form of an emulsion of oil which contains the rubber gives a further improvement in the durability of the asphalt. These tests show that an asphalt which has a low durability rating (i.e., shows a large abrasion loss), can have its durability largely increased by treatment according to my invention. In fact, the tests show that an asphalt pavement which has the elastomer added, according to my invention, can be expected to give a pavement having a longer life than the untreated asphalt pavement.

In certain tests of the following examples, the corresponding polymer solutions were used rather than the emulsions since the water would have flashed off during addition to the heated asphalt. The time of exposure of the rubber and asphalt to elevated temperatures above the softening point of asphalt in tests where the polymer solution was added was held to such a low interval of time that no substantial deterioration of the rubber or asphalt is obtained. The asphalt cools rapidly to its set point.

An advantage of adding elastomer in the form of solution in oil is that the elastomer may be incorporated at a much lower temperature than is possible when elastomer is added undiluted by oil and directly to heat liquefied asphalt. The incorporation can be made in a fraction of the time that it is necessary when the elastomer is added to the asphalt undiluted. Further, all elastomer incorporated is "effective" rubber and thus only a very small amount of rubber is needed to accomplish the desired effects. The deterioration of the rubber is thus minimized.

to the decrease in consistency of the asphalt by virtue of the added oil, which counterbalances part of the hardening during mixing. To compare asphalts of different consistency, the viscosity has to be taken into account as shown by Halstead, Rostler and White, supra.

The effect of the oil alone may be compared with the asphalt treated with the emulsion of the oil containing 7.5 percent of natural rubber in oil, the emulsion containing 7.5 percent of the elastomer SBR–1500 and the emulsion of the oil containing 7.5 percent of the SBR block copolymer having an S/B ratio of 25/75. It will be observed that the Boscan asphalt after treatment with the emulsions 37, 42 and 47, see Table II, had a lower abra-

TABLE III

| | Sample identification | | | | | |
|---|---|---|---|---|---|---|
| | B, control 1 | B+4, control 2 | B+35,[1] control 3 | B+37 | B+42 | B+47 |
| Asphalt | Boscan | Boscan | Boscan | Boscan | Boscan | Boscan |
| Preparation used | None | 4 | 35 | 37 | 42 | 47 |
| Polymer | None | None | SBR-1500 | SBR-1500 | [2] | [3] |
| Rubber content, percent | None | None | 0.75 | 0.75 | 0.75 | 0.75 |
| Abrasion loss: | | | | | | |
| Unaged: | | | | | | |
| Percent | 36 | 5.5 | 1.42 | 4.2 | 2.9 | 0.86 |
| Mg./rev.[4] | 1.365 | 0.220 | 0.061 | 0.164 | 0.114 | 0.038 |
| Aged 7 days: | | | | | | |
| Percent | [5]100 | 71 | 39 | 32 | 43 | 45 |
| Mg./rev.[4] | 6.734 | 2.832 | 1.594 | 1.309 | 1.662 | 1.814 |
| Average 0 and 7 days: | | | | | | |
| Percent | >68 | 38 | 20 | 18 | 23 | 23 |
| Mg./rev.[4] | 4.050 | 1.526 | 0.828 | 0.736 | 0.888 | 0.926 |

[1] Rubber solution added to heat liquified asphalts before mixing with sand; all samples except the controls 1 and 3 were made by adding the respective emulsions to portions of asphalt sand mix.
[2] Natural rubber 1 RSS.
[3] SBR block copolymer 25/75 S/B.
[4] Milligrams loss per revolution.
[5] At 297 revolutions.

The asphalt-sand pellets were processed by the Pellet Test Method referred to above. Thus, Table III compares the effect of the elastomer using different oil-elastomer solutions. Referring to Table III and comparing the control 1, that is, the Boscan asphalt in the test with control 2 it can be seen that the addition to the asphalt of oil alone (control 2), reduced the unaged abrasion loss. The loss after 297 revolutions on the aged sample was 100 percent. On the control 2, however, the loss was 71 percent after 500 revolutions. The lower numerical values of abrasion loss measured on control 2 are primarily due sion in mg./rev. and lost only 32, 43 and 45 percent, respectively, after 500 revolutions in the Pellet Test.

TABLE IV

| | Sample identification | | | | | |
|---|---|---|---|---|---|---|
| | V, control 1 | V+4, control 2 | V+35,[1] control 3 | V+37 | V+42 | V+47 |
| Asphalt | San Joaquin Valley | San Joaquin Valley | San Joaquin Valley | San Joaquin Valley | San Joaquin Valley | San Joaqun Valliey |
| Preparation used | None | 4 | 35 | 37 | 42 | 47 |
| Polymer | None | None | SBR-1500 | SBR-1500 | [2] | [3] |
| Rubber content, percent | None | None | 0.75 | 0.75 | 0.75 | 0.75 |
| Abrasion loss: | | | | | | |
| Unaged: | | | | | | |
| Percent | 50 | 1.47 | 3.75 | 0.52 | 0.79 | 1.5 |
| Mg./rev.[4] | 1.822 | 0.058 | 0.153 | 0.020 | 0.031 | 0.57 |
| Aged 7 days: | | | | | | |
| Percent | [5]100 | 16 | 14.5 | 2.3 | 15.0 | 10.8 |
| Mg./rev.[4] | 5.919 | 0.650 | 0.613 | 0.096 | 0.604 | 0.440 |
| Average 0 and 7 days: | | | | | | |
| Percent | >75 | 8.7 | 9 | 1.4 | 7.9 | 6.3 |
| Mg./rev.[4] | 3.870 | 0.354 | 0.383 | 0.058 | 0.318 | 0.248 |

[1] Rubber solution added to heat liquified asphalts before mixing with sand; all samples except the controls 1 and 3 were made by adding the respective emulsions to portions of asphalt sand mix.
[2] Natural rubber #1 RSS.
[3] SBR block copolymer 25/75 S/B.
[4] Milligrams loss per revolution.
[5] At 342 revolutions.

A similar result is seen for the Jan Joaquin Valley asphalt. This asphalt is somewhat superior to the Boscan in that 100 percent loss of the aged sample did not occur until after 342 revolutions. Tests similar to those performed with the Boscan asphalt were repeated using the same emulsions. As can be seen, the oil alone, control 2, without dissolved elastomer, gave improvement and reduced abrasion after 500 revolutions to 16 percent.

The loss at 500 revolutions was further reduced employing the emulsions 37, 42 and 47, with the San Joaquin Valley asphalt.

abrasion resistance of the oil-treated Boscan asphalt (control 2 in Table 5), as measured in milligrams loss per revolution, was substantially greater than that of con-

TABLE V

| | Sample identification | | | | |
|---|---|---|---|---|---|
| | B, control 1 | B+4, control 2 | B+47 | B+67 | B+3599 |
| Asphalt | Boscan | Boscan | Boscan | Boscan | Boscan |
| Emulsion | None | 4 | 47 | 67 | 3559 |
| Polymer | None | None | (1) | (1) | (1) |
| Rubber content, percent | None | None | 0.75 | 0.75 | 0.75 |
| Abrasion loss: | | | | | |
| Unaged: | | | | | |
| Percent | 36 | 5.5 | 0.86 | 3.5 | 1.6 |
| Mg./rev.[3] | 1.365 | | 0.038 | 0.139 | 0.064 |
| Aged 7 days: | | | | | |
| Percent | [2]100 | 71 | 45 | 59 | 60 |
| Mg./rev.[3] | 6.734 | 2.832 | 1.814 | 2.360 | 2.476 |
| Average 0 and 7 days: | | | | | |
| Percent | 68 | 38 | 23 | 31 | 31 |
| Mg./rev.[3] | 4.050 | 1.526 | 0.926 | 1.250 | 1.270 |

[1] SBR block copolymer, 25/75 S/B.
[2] At 297 revolutions.
[3] Milligrams loss per revolution.

TABLE VI

| | Sample identification | | | | |
|---|---|---|---|---|---|
| | V, control 1 | V+4, control 2 | V+47 | V+67 | V+3599 |
| Asphalt | San Joaquin Valley | San Joaquin Valley | San Joaquin Valley | San Joaquin Valley | San Joaquin Valley |
| Emulsion | None | 4 | 47 | 67 | 3599 |
| Polymer | None | None | (1) | (1) | (1) |
| Rubber content, percent | None | None | 0.75 | 0.75 | 0.75 |
| Abrasion loss: | | | | | |
| Unaged: | | | | | |
| Percent | 50 | 1.47 | 1.5 | 2.0 | 1.04 |
| Mg./rev.[2] | 1.822 | 0.058 | 0.057 | 0.079 | 0.040 |
| Aged 7 days: | | | | | |
| Percent | [3]100 | 16 | 10.8 | 13.1 | 12.9 |
| Mg./rev.[2] | 5.919 | 0.650 | 0.440 | 0.555 | 0.547 |
| Average 0 and 7 days: | | | | | |
| Percent | 75 | 8.7 | 6.3 | 7.5 | 7.0 |
| Mg./rev.[2] | 3.870 | 0.354 | 0.248 | 0.317 | 0.294 |

[1] SBR block copolymer 25/75 S/B.
[2] Milligrams loss per revolution.
[3] At 342 revolutions.

Tables V and VI show tests similar to the tests referred to in Tables III and IV, using both Boscan and San Joaquin Valley asphalts, but employing different oils. The values reported in Tables V and VI show that various oils can be used in the practice of my invention. It will be seen that as in the tests reported in Tables III and IV, the addition of the rubber as an oil emulsion improved the asphalt as compared with the untreated asphalt. The trol 1 to which no oil was added. The addition of the 25/75 S/B block copolymer, improved the abrasion resistance as shown by the percent weight loss per revolution after 500 revolutions.

A similar result for the San Joaquin Valley asphalt V, is shown in the results recorded in Table VI when treated with the emulsions 47, 67 and 3599 (see Table II).

TABLE VII

| | Sample identification | | | | | |
|---|---|---|---|---|---|---|
| | V+36 | V+37 | V+38 | V+23, V+41[1] | V+42 | V+18 |
| Asphalt | San Joaquin | San Joaquin | San Joaquin | San Joaquin | San Joaquin | San Joaquin |
| Emulsion used | 36 | 37 | 38 | 23, 41 | 42 | 18 |
| Polymer | SBR-1500 | SBR-1500 | SBR-1500 | (2) | (2) | (3) |
| Rubber content, percent | 0.5 | 0.75 | 1.0 | 0.5 | 0.75 | 0.5 |
| Abrasion loss: | | | | | | |
| Unaged: | | | | | | |
| Percent | 0.92 | 0.52 | 0.92 | 1.55 | 0.79 | 0.36 |
| Mg./rev | 0.037 | 0.020 | 0.036 | 0.059 | 0.031 | 0.014 |
| Aged 7 days: | | | | | | |
| Percent | 10.1 | 2.3 | 8.5 | 14 | 15 | 20 |
| Mg./rev | 0.384 | 0.096 | 0.319 | 0.577 | 0.604 | 0.813 |
| Average, 0 and 7 days: | | | | | | |
| Percent | 5.5 | 1.4 | 4.7 | 7.8 | 7.9 | 10.1 |
| Mg./rev | 0.210 | 0.058 | 0.178 | 0.318 | 0.318 | 0.414 |

[1] Data are averages of tests with two emulsions of same composition.
[2] Natural rubber, #1 RSS.
[3] Synthetic cis-poly (isoprene).

TABLE VIII

| | Sample identification | | | | | | |
|---|---|---|---|---|---|---|---|
| | V+46 | V+47 | V+25, V+48 [1] | V+20 | V+26 | V+22 | V+24 |
| Asphalt | San Joaquin Valley | San Joaquin Valley | San Joaquin Valley | San Joaquin Valley | San Joaquin Valley | San Joaquin Valley | San Joaquin Valley |
| Emulsion Used | 46 | 47 | 25, 48 | 20 | 26 | 22 | 24 |
| Polymer | [2] | [2] | [2] | [3] | [4] | [5] | [6] |
| Rubber content, percent | 0.5 | 0.75 | 1.0 | 1.0 | 1.0 | 1.0 | 1.0 |
| Abrasion loss: | | | | | | | |
| Unaged: | | | | | | | |
| Percent | 0.93 | 1.5 | 0.82 | 0.10 | 0.07 | 0.76 | 0.49 |
| Mg./rev | 0.036 | 0.057 | 0.032 | 0.004 | 0.003 | 0.029 | 0.019 |
| Aged 7 days: | | | | | | | |
| Percent | 2.8 | 10.8 | 10.3 | 6.2 | 5.8 | 9.3 | 9.3 |
| Mg./rev | 0.115 | 0.440 | 0.411 | 0.255 | 0.232 | 0.383 | 0.382 |
| Average, 0 and 7 days: | | | | | | | |
| Percent | 1.8 | 6.3 | 5.6 | 3.2 | 2.9 | 5.0 | 4.9 |
| Mg./rev | 0.076 | 0.248 | 0.222 | 0.130 | 0.118 | 0.206 | 0.200 |

[1] Data are averages of tests with two emulsions of same composition.
[2] SBR block copolymer 25/75 S/B.
[3] SBR block copolymer 35/65 S/B.
[4] SBR block copolymer 40/60 S/B.
[5] SBR block copolymer 50/50 S/B.
[6] Synthetic trans-poly (isoprene).

Tables VII and VIII show the effect of the concentration of elastomers in the oil in the emulsion used to treat San Joaquin asphalt in the Pellet Test. The emulsions are identified in Table II. It can be seen that as low as 0.75 percent or less of rubber in the asphalt, actually from 0.5 to 1 percent, was sufficient to make a marked improvement in the abrasion resistance as measured by the milligrams loss per revolution in the Pellet Test.

The amount of rubber to be incorporated in rubberized asphalt can be grouped in three ranges:

(1) by weight of the asphalt, 0.1–2.5%, which is the primary range of this invention;
(2) by weight of the asphalt, 2.5–10%, which is the range used in most current methods; and
(3) by weight of the asphalt over 10%, which might be advantageous if special effects are desired, e.g., in a tennis court.

The range of up to 2.5% constitutes, by my tests, the most practical amount for producing the greatest benefits. Higher amounts of rubber impart rubbery properties in a higher degree, but the greatest effect of rubberizing in terms of changes of properties of asphalts is in the range of below 2.5%. Above this range, the improvement of the asphalt by increasing the rubber content is more gradual. My method of adding rubber is, however, not confined to the lower amounts to be used; and amounts of 2.5% to 10% or more can be incorporated by procedure if special effects are desired or called for by construction specifications.

TABLE IX

| | Sample identification | | | | | |
|---|---|---|---|---|---|---|
| | B+36 | B+37 | B+38 | B+23, B+41 [1] | B+42 | B+18 |
| Asphalt | Boscan | Boscan | Boscan | Boscan | Boscan | Boscan |
| Emulsion used | 36 | 37 | 38 | 23,41 | 42 | 18 |
| Polymer | SBR-1500 | SBR-1500 | SBR-1500 | [2] | [2] | [3] |
| Rubber content, percent | 0.5 | 0.75 | 1.0 | 0.5 | 0.75 | 0.5 |
| Abrasion loss: | | | | | | |
| Unaged: | | | | | | |
| Percent | 1.9 | 4.2 | 7.2 | 2.3 | 2.9 | 0.50 |
| Mg./rev | 0.078 | 0.164 | 0.380 | 0.092 | 0.114 | 0.019 |
| Aged 7 days: | | | | | | |
| Percent | 45 | 32 | 52 | 56 | 43 | 68 |
| Mg./rev | 1.791 | 1.309 | 2.083 | 2.258 | 1.662 | 2.676 |
| Average 0 and 7 days: | | | | | | |
| Percent | 23 | 18 | 30 | 30 | 23 | 34 |
| Mg./rev | 0.934 | 0.736 | 1.232 | 1.175 | 0.888 | 1.348 |

[1] Data are averages of tests with two emulsions of same composition.
[2] Natural rubber, $1 RSS.
[3] Synthetic cis-poly(isoprene).

TABLE X

| | Sample identification | | | | | | |
|---|---|---|---|---|---|---|---|
| | B+46 | B+47 | B+25, B+48 [1] | B+20 | B+26 | B+22 | B+24 |
| Asphalt | Boscan | Boscan | Boscan | Boscan | Boscan | Boscan | Boscan |
| Emulsion used | 46 | 47 | 25, 48 | 20 | 26 | 22 | 24 |
| Polymer | [2] | [2] | [2] | [3] | [4] | [5] | [6] |
| Rubber content, percent | 0.5 | 0.75 | 1.0 | 1.0 | 1.0 | 1.0 | 1.0 |
| Abrasion loss: | | | | | | | |
| Unaged: | | | | | | | |
| Percent | 18 | 0.86 | 1.89 | 2.0 | 0.42 | 0.95 | 0.54 |
| Mg./rev | 0.700 | 0.038 | 0.072 | 0.074 | 0.016 | 0.035 | 0.20 |
| Aged 7 days: | | | | | | | |
| Percent | 51 | 45 | 51 | 71 | 43 | 65 | 62 |
| Mg./rev | 2.003 | 1.814 | 1.988 | 2.793 | 1.701 | 2.567 | 2.419 |
| Average 0 and 7 days: | | | | | | | |
| Percent | 34 | 23 | 26 | 36 | 22 | 33 | 31 |
| Mg./rev | 1.352 | 0.926 | 1.030 | 1.434 | 0.858 | 1.301 | 1.220 |

[1] Data are averages of tests with two emulsions of same composition.
[2] SBR block copolymer, 25/75 S/B.
[3] SBR block copolymer, 35/65 S/B.
[4] SBR block copolymer, 40/60 S/B.
[5] SBR block copolymer, 50/50 S/B.
[6] Synthetic trans-poly (isoprene).

Tables IX and X show the effect of varying the concentration of the elastomer in the oil in the emulsion used to treat Boscan asphalt in the pellet test. As shown, elastomer contents of 0.5 to 1.0 percent were effective in increasing the abrasion resistance of the asphalt-aggregate pellets.

The above data show that an asphalt-aggregate mix may be improved in its durability by incorporating an elastomer into the asphalt under conditions where no substantial deterioration of the asphalt or elastomer occurs. This is accomplished according to my invention by treating the asphalt-aggregate mix in the form of a pavement by an emulsion of an oil containing dissolved elastomer.

Three different controls were used, the untreated asphalt (control 1), the asphalt to which only oil has been added (control 2), and asphalt to which a solution of rubber in oil is added to the asphalt before mixing with aggregate. The total binder incorporated into the test specimens was in all cases 2 parts of binder (weight of elastomer and asphalt) for 100 parts of Ottawa sand. When the rubber was added to the Ottawa sand-asphalt mix, it was in the form of the emulsion; when added to the asphalt before mixing with Ottawa sand, it was added as a solution constituting the oil phase of the emulsion. In this mixing procedure the time of exposure of the oil-rubber-asphalt mixture is sufficiently limited to prevent any substantial deterioration of the rubber.

As demonstrated by the foregoing specification and test data set forth therein, my invention provides a method of improving the properties of asphalt by treatment of an asphalt aggregate mixture with an oil-in-water emulsion, as described previously, in which the oil phase contains a dissolved elastomer. Preferably, the emulsion is a cationic emulsion and may contain a cationic emulsifier in an amount which is preferably less than about 3 percent by weight based on the weight of the oil phase. More preferably, the weight of the cationic emulsifier ranges between about 0.5 to about 1.5 percent by weight of the oil phase.

A great number of suitable cationic surfactants are available. The cationic surfactant should be a good emulsifying agent and provide a lasting positive charge. Small amounts of a nonionic surfactant can also be added to facilitate emulsification and to minimize foaming.

Emulsifiers may be of the class of fatty quaternary ammonium salts, fatty amido-amino-amine salts, e.g., amido-amino-amine acetate, etc., and include the use of cationic surfactants with nonionic surfactants such as poly(ethoxy) compounds. Various suitable surfactants are described in standard textbooks such as "Encyclopedia of Surface Active Agents" by Sisley and Wood (Chemical Publishing Company, Inc., New York), and "Surface Active Agents and Detergents," by Schwarz, Perry and Berch (Interscience Publishers, New York).

In addition to emulsifying agents, stabilizers may also be employed to stabilize the emulsion against electrolytes which may be present in the water employed in making or diluting the emulsion.

By a cationic emulsion, I refer to one in which the oil phase will deposit on the negative electrode if the emulsion is subjected to electrophoresis. Nonionic surfactants, as described, may be present in an amount up to as high as about 2 percent by weight of the oil phase.

Taking into account the average compacted density of 144 lbs./ft.$^3$ and the average asphalt content of 6% of highway asphalt concrete, a practical method of calculating the rate of application of an emulsion according to this invention is in the majority of cases of present day highway construction provided by the formula:

$$E = \frac{78}{R \times S}$$

where

E equals gallons of emulsion required for one square yard of asphalt pavement per inch thickness of asphalt pavement in order to incorporate 1% of rubber into the asphalt contained in the pavement, S equals the weight percent of the oil phase of the emulsion, and R equals the weight percent of rubber in the oil phase.

If it is desired to incorporate a larger amount of rubber into the asphalt, e.g., 2 percent or 5 percent by weight of the asphalt in the pavement, E is multiplied by 2 or 5 to give the required application level.

In illustrating embodiments of my invention, in the foregoing specification, I have referred to various percentages, various asphalts, various oils, various elastomers, and the like.

Whenever I employ the terms, rubber, rubberized asphalt or rubberized asphalt pavement, I include in the term rubber polymers other than natural rubbers or synthetic diene polymers.

It should be understood that these specifics are solely for the purpose of illustration and should not be construed as limitations on my process, as defined in the following claims.

I claim:

1. An aqueous emulsion comprising an oil phase consisting essentially of a solution of an elastomer in an oil, which oil has an initial boiling point of about 300° C. at 760 mm. Hg, ASTM test D86, said oil being soluble in normal pentane in accordance with ASTM test D2006, and containing not more than 1% asphaltenes, said oil-rubber solution being dispersed in said emulsion as fine particles and said emulsion being stable on contact with an asphalt road surface and said emulsion having the property of penetrating into said road surface.

2. The emulsion of claim 1 in which the elastomer is a natural rubber or a styrene-butadiene copolymer or a cis-poly(isoprene) rubber.

3. The emulsion of claim 1 in which the said oil phase has a viscosity of at least 50 Saybolt Universal at 210° F.

4. The emulsion of claim 3 in which the elastomer is a natural rubber or a styrene-butadiene copolymer or a cis-poly(isoprene) rubber.

5. The emulsion of claim 1 in which the concentration of the elastomer is about 2 to about 15% by weight based on said oil phase.

6. The emulsion of claim 5 in which the elastomer is a natural rubber or a styrene-butadiene polymer or a cis-poly(isoprene) rubber.

7. The emulsion of claim 5 in which said oil has a viscosity of at least 50 Saybolt Universal at 210° F.

8. The emulsion of claim 7 in which the elastomer is a natural rubber or a styrene-butadiene polymer or a cis-poly(isoprene) rubber.

9. The emulsion of claim 2 in which the styrene-butadiene copolymer is an SBR block copolymer.

10. The emulsion of claim 9 in which the block copolymer is from about 2 to about 15% by weight of the oil phase.

11. The emulsion of claim 9 in which the SBR block copolymer has an S/B ratio of from about 25/75 to about 50/50.

12. The emulsion of claim 11 in which the block copolymer is from about 2 to about 15% by weight of the oil phase.

13. The aqueous emulsion of claim 1 in which the concentration of the rubber in the oil-rubber solution is above about 2% by weight based on the oil phase.

14. The emulsion of claim 1 in which the concentration of the rubber in the oil-rubber solution is in the range of about 2% to about 25% by weight based on the oil in said oil phase.

(References on following page)

References Cited

UNITED STATES PATENTS

| | | | |
|---|---|---|---|
| 2,458,222 | 1/1949 | Talalay | 260—29.7 EM |
| 3,562,193 | 2/1971 | Leeks et al. | 260—29.7 GP |
| 3,265,765 | 8/1966 | Holden, et al. | 260—876 |
| 3,434,994 | 3/1969 | Smit, et al. | 260—29.7 |
| 3,479,313 | 11/1969 | Kreider | 260—33.6 AQ |

OTHER REFERENCES

Encyclopedia of Chem. Tech. (2nd ed.) (vol. 2), p. 798, (Interscience) (New York) (1963).

Skoog et al.: Fundamentals of Analytical Chem. (Holt, Rinehart and Winston) (New York) (1963), pp. 750–751.

ALLAN LIEBERMAN, Primary Examiner

H. H. FLETCHER, Assistant Examiner

U.S. Cl. X.R.

94—20; 106—278, 279, 280, 281; 260—28.5 AS, 29.7 EM, 33.6 AQ, 41.5 R, 739, 745, 758, 759, 760, 761

PO-1050
(5/69)

UNITED STATES PATENT OFFICE
CERTIFICATE OF CORRECTION

Patent No. 3,763,074  Dated October 2, 1973

Inventor(s) FRITZ S. ROSTLER

It is certified that error appears in the above-identified patent and that said Letters Patent are hereby corrected as shown below:

Column 1, insert - assignor to Phillips Petroleum Company, Bartlesville, Okla. -

Column 1, line 23, correct the spelling of "BACKGROUND."

Column 1, line 49, change "in" to - is - .

Column 5, lines 1 and 2 should read: "The rate of application of the oil emulsion in gallons"

Column 6, line 1 should read: "The following examples illustrate the effect of treating an asphalt-aggregate combination with an emulsion ac-"

Column 7, line 13, change "col. 6" to - col. 4 - .

Column 10, line 68: "Jan" should be - San - .

Column 14, line 35, insert - my - after "by."

Table VII, spanning columns 11 and 12, in the column of the table headed by the designation "V+38" the last number should be - 0.173 - instead of "0.178."

In the same table, the designation "V+23" positioned between "V+38" and "V+41" should be placed above "V+41."

Signed and sealed this 14th day of May 1974.

(SEAL)
Attest:

EDWARD M. FLETCHER, JR.
Attesting Officer

C. MARSHALL DANN
Commissioner of Patents